Figure 8:
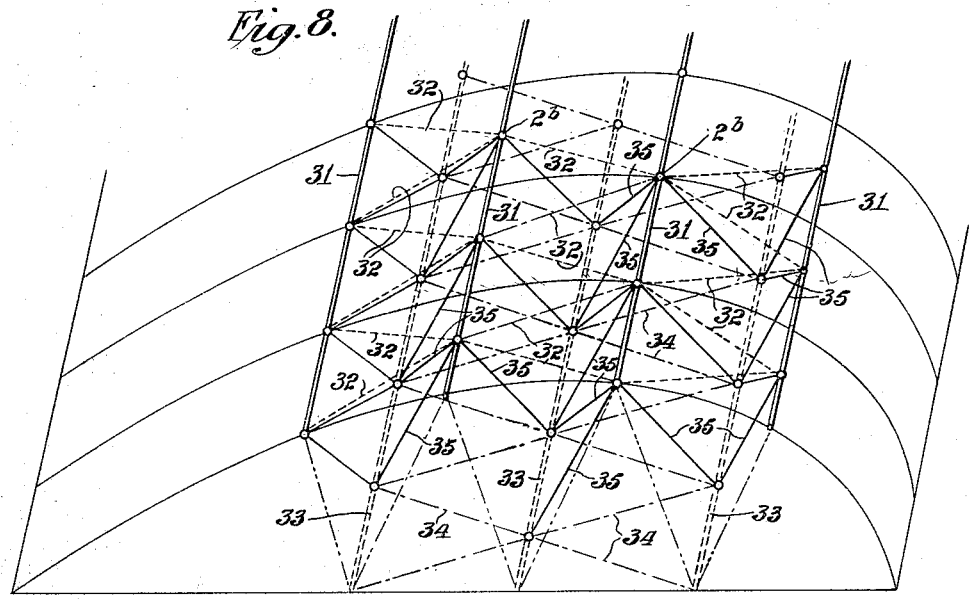

Aug. 7, 1923.
C. W. HALL
AIRCRAFT FITTING
Filed April 9, 1921
1,463,888
4 Sheets-Sheet 1
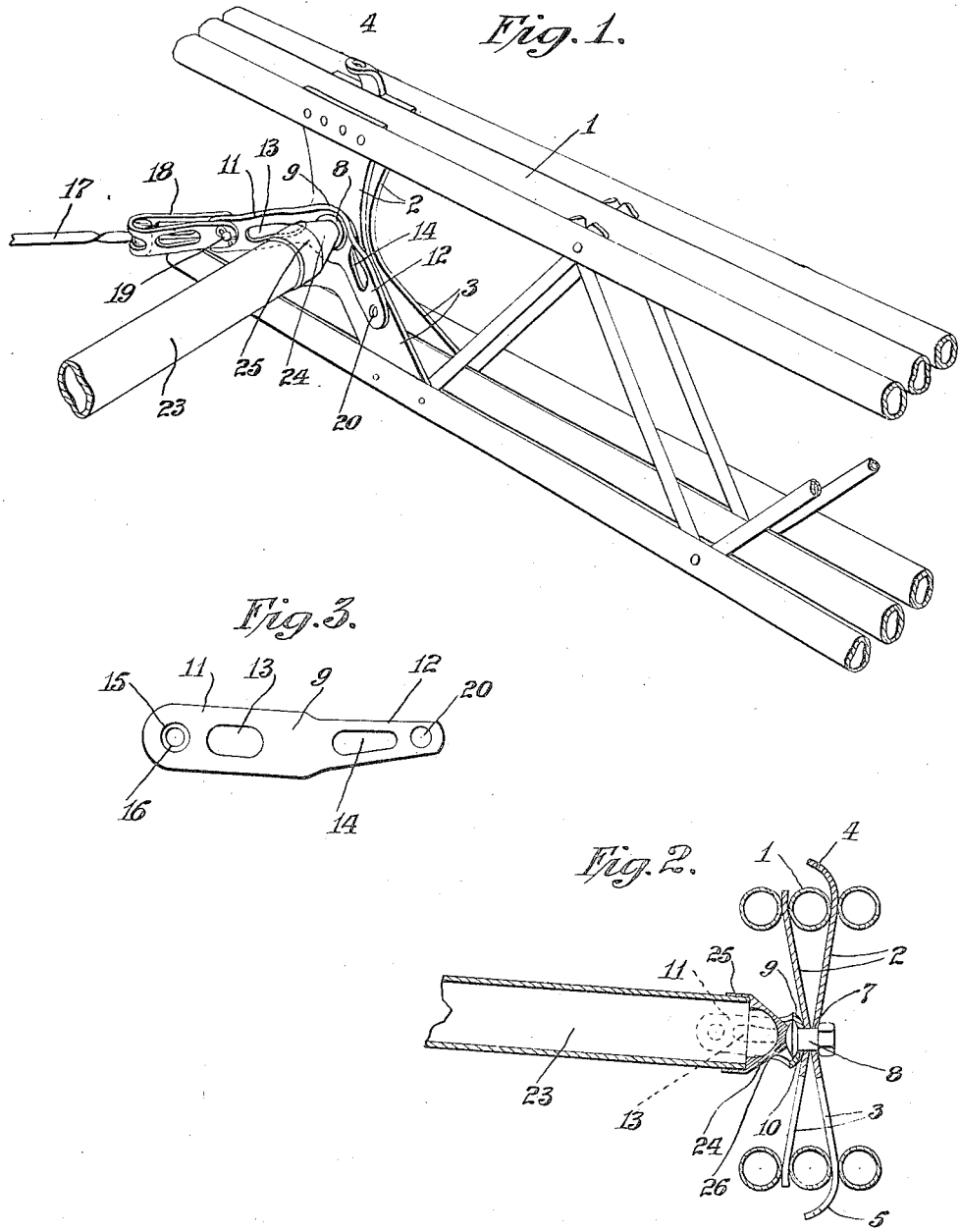
Charles Ward Hall
INVENTOR
BY Wm. B. Whitney
ATTORNEY Aug. 7, 1923.
1,463,888
C. W. HALL
AIRCRAFT FITTING
Filed April 9, 1921
4 Sheets-Sheet 2
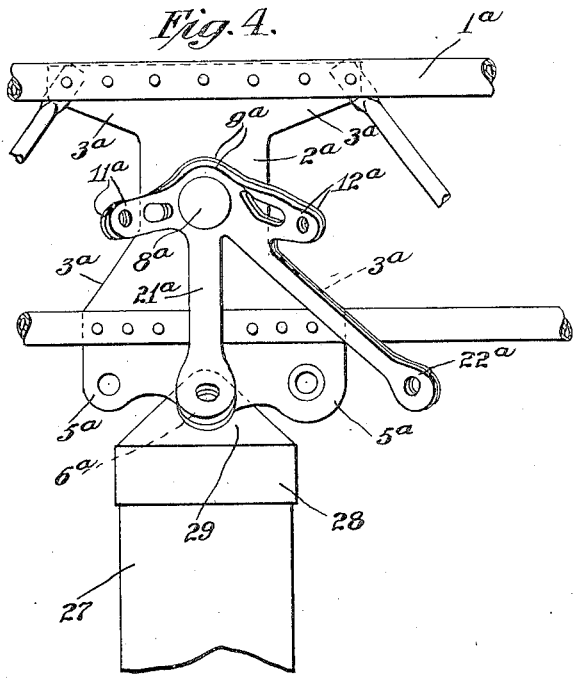
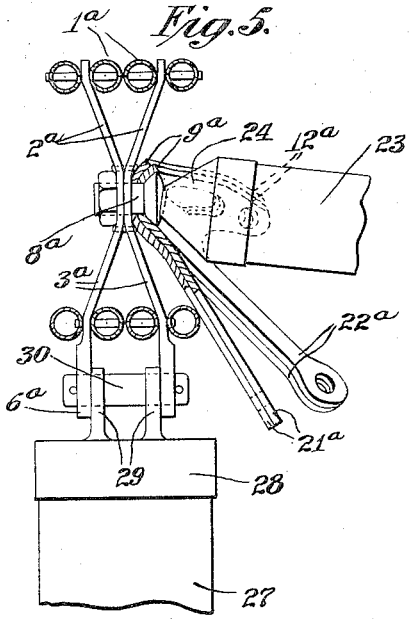
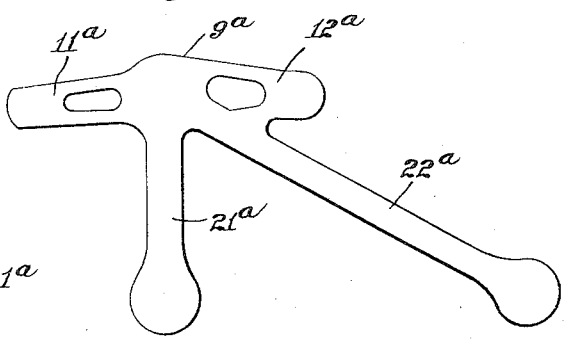
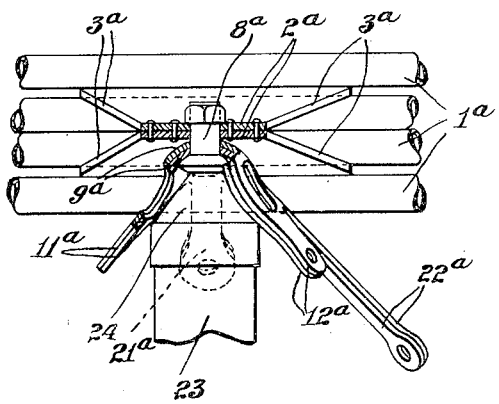
Charles Ward Hall
INVENTOR
BY W. B. Whitney
ATTORNEY Aug. 7, 1923.

C. W. HALL
AIRCRAFT FITTING
Filed April 9, 1921

1,463,888

4 Sheets-Sheet 3

Charles Ward Hall
INVENTOR

BY W. B. Whitney
ATTORNEY

Aug. 7, 1923.

C. W. HALL
AIRCRAFT FITTING
Filed April 9, 1921

1,463,888

4 Sheets-Sheet 4

Charles Ward Hall
INVENTOR

BY W. B. Whitney
ATTORNEY

Patented Aug. 7, 1923.

1,463,888

UNITED STATES PATENT OFFICE.

CHARLES WARD HALL, OF LARCHMONT, NEW YORK.

AIRCRAFT FITTING.

Application filed April 9, 1921. Serial No. 459,889.

*To all whom it may concern:*

Be it known that I, CHARLES WARD HALL, a citizen of the United States, and a resident of Larchmont, in the county of Westchester and State of New York, have invented certain new and useful Improvements in Aircraft Fittings, of which the following is a specification.

My present invention relates to aircraft fittings, and, more specifically, to a joint fitting by which to join together a plurality of parts or members having oblique, or at least non-parallel, lines of action; and the object of my improvements is to provide a form of jointure which with a minimum amount and weight of metal not only will efficiently transmit the direct stresses of tension or compression, or both, through an oblique angle but also affords a means for controlling, and thereby substantially eliminating or distributing as desired, the indirect stresses, such as those of bending and torsion.

To this end, the invention comprises, as its principal feature, a ball-head bolt and, in combination therewith, a metal plate which around the opening through which the bolt passes is curvilinearly cupped to fit the curved inner surface of the bolt head and has leading therefrom, at an acute angle to the axis of the cup and bolt, one or more integral straps or arms, curved at the rim in substantial conformity therewith and acting thereon through a considerable arc, each of which serves either as an anchorage for a diagonal stay wire or for the support of a corresponding tension - compression brace member. The radius of curvature of the bolt head and inner surface of the cupped plate should be approximately equal to the diameter of the bolt, to secure the best functional relationship between these parts, and each anchorage arm is preferably cut away centrally, through a portion of its length, so as to provide two forks or branches more or less separated one from the other at the rim of the cup. This division of an arm may be omitted whenever its angular lead approaches a right angle to the axis of the cup, but becomes more and more important, and calls for a greater and greater degree of separation of the two forks, the more acute the angle of lead. For example, where the lead of the arm is at an angle of forty-five degrees, the central or axial lines of its forks should be approximately ninety-five degrees apart at the rim of the cup, and as the lead angle approaches zero the two forks should lead off as nearly as practicable from diametrically opposite sides of the cup. In case the lead angle is less than thirty degrees, however, I prefer to form the forked arm by making two separate arms and bringing together and overlapping their outer ends, since otherwise it is difficult or impossible to shape up the plate without rupturing the forks at the rim of the cup. By a joint thus formed the direct stresses of tension and compression will be transmitted without subjecting the bolt to bending stress, thereby substantially doubling its effective strength, and without torsion in the part or member to which the plate is bolted.

A second feature is provided by a special tapering terminal extension, specifically shown as a separable cone-shaped socket having different degrees of taper on its outer and inner surfaces to thereby give the walls their greatest thickness adjacent the tip and open base of the cone, with which to join a tubular strut concentrically with diagonal stay wires. The socket, with the end of the strut abutting against the base of the cone and held centered thereon by a depending annular skirt, is in turn held by the stay wires in butt engagement with the head of the bolt through a ball and socket connection, the ball being formed either on the outer surface of the bolt head or on the tip of the socket. It has been found that such socket with properly tapered walls fails in tension, whereas a socket with walls of equal thickness fails through shear, and consequently, when made of duralumin for example, has a unit strength fully twice that of the ordinary socket.

Still another feature of the invention consists, where for instance struts and diagonals such as stay wires and braces are to be joined to a lattice girder, in a single or double web plate, of substantially Y or X shape, which is inserted in and as a part of the lattice web and to the center of which the cupped plate is or may be bolted. This plate may also have at top or bottom, to project beyond the chords of the girder, one or more end extensions or ears for the support of a strut or to which to anchor an additional stay wire or wires. The outwardly tapering sides or side extensions provided at either or both of its ends by a web plate of the shape indicated will, when united in the chords end to end with the diagonal web members adjoining on either side give to the web a continuity which will enable it to transmit the web stresses uniformly, thereby keeping at a minimum the indirect stresses in the panels of the girder adjoining the two sides of the plate which stresses, when the girder is subjected to column action, otherwise might be fully as great as the direct stresses and have in the past caused disastrous failures. In the joint thus formed the converging lines of action of all of the non-parallel members which are to be joined thereby are centered at or near the gravity axis of the girder as desired.

The invention is shown, by way of illustration and not of limitation, in the accompanying drawings, in which—

Figure 9:
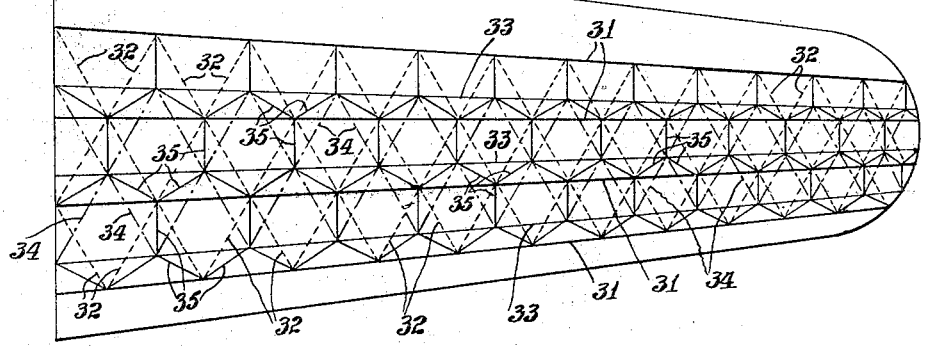
Figure 10:
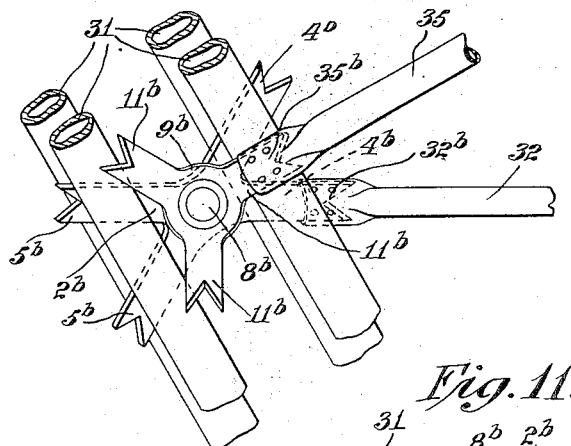
Figure 11:
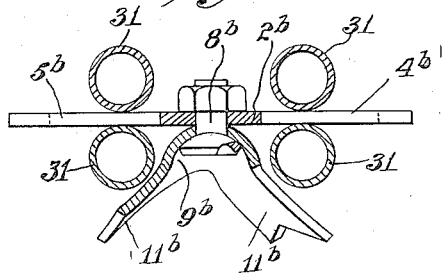
Figure 12:
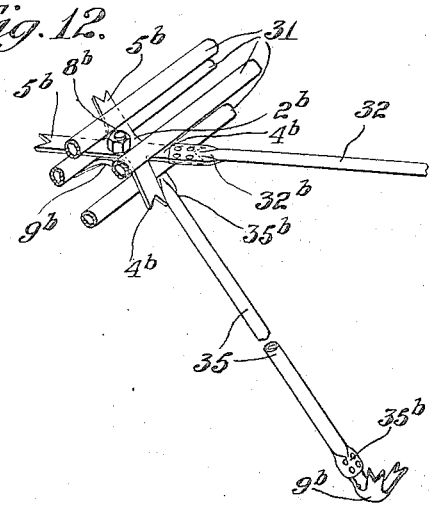

Figure 1 is a view showing, in perspective a portion of a wing spar of an airplane, adjacent a drift panel point, and joint fittings, for joining thereto a drift strut, a drift wire and its counter, and other wires, embodying the several features of my invention; Fig. 2, a central vertical section through the joint of Fig. 1; Fig. 3, a face or plan view of the blank from which the cupped plate member of the joint is shaped up; Fig. 4, a view showing, in elevation, the portion of a wing spar adjoining a lift-drift panel point and the joint fittings for the lift and drift struts, lift and drift wire and their counters, and other stay wires; Figs. 5 and 6, central vertical and horizontal sections, respectively, through the joint of Fig. 4; Fig. 7, a face view of the blank for each part of the double cupped plate of the joint; Figs. 8 and 9, views showing diagrammatically, in broken perspective and in plan respectively and on somewhat different scales, a tetrahedral frame of one-half of an airplane wing embodying certain but not all of the features of my invention; Fig. 10, a detail of the tetrahedral frame of Figs. 8 and 9 showing, in perspective, a typical joint fitting; Fig. 11, a central section through the joint of Fig. 10; and Fig. 12, another detail of the tetrahedral frame showing, in perspective, one of the diagonal or brace members and the joint fittings both for its upper and lower ends.

Similar reference characters designate like parts throughout the several figures of the drawings.

Referring first to Figs. 1–3 of the drawings, the spar 1 is of lattice truss construction, with multitubular chords and a double web formed of tubing and spaced apart by the middle tube of the chords. The double web member 2, consisting of two inverted-Y plates shaped to contact midway of their length and to stand properly spaced apart at top and bottom, is framed into the spar with the ends of the plates straddling the middle tube of the chords; and, with the downwardly and outwardly inclined sides or side extensions 3 formed by their bifurcated lower ends thinned and set to overlap end to end the adjacent tubular diagonals, give to the web the desired structural and functional continuity. One of the web plates is provided at its upper end with an ear 4 and on one fork of its lower end with an ear 5, which ears serve as anchorages for control leads and are bent over laterally to bring them into alignment therewith. To the center of this double web plates, drilled at 7 for the purpose, there is bolted, by the ball-head bolt 8, the spherically cupped plate 9 which has drilled in the bottom or axis of the cup (preferably, to prevent distortion, after the blank has been shaped up) a hole 10 through which the bolt passes. The radius of curvature of the bolt head and of the cup is, as shown, equal to the diameter of the bolt. The cupped plate has two oppositely disposed arms 11 and 12 which lead therefrom at an angle of approximately forty-five degrees to the axis of the cup and are cut away at 13 and 14, respectively, to divide each into two forks separated about ninety degrees one from the other at the rim of the cup. The outer end of the arm 11 is drilled at 15 to receive the bushing 16, and a drift wire 17 is anchored thereto by a clevis 18 and clevis-pin 19; or, if found desirable, a clevis can be formed integral with the arm by making the arm of sufficient length and doubling it back and nesting its cupped outer end in the cup of the plate. The arm 12 is also drilled at 20, or otherwise shaped, for the anchorage thereto of the counter drift wire. The drift strut 23 is joined to the spar concentrically with the drift wire and its counter, by the cone-shaped socket 24, formed with a straight taper of thirty to forty-five degrees on its outer surface and with its inner surface concavely tapered to give to the walls their greatest thickness at the base of the cone, which is provided at its base with an annular skirt 25 to receive and hold in position the end of the strut and in its tip has a spherical cup 26 fitting the head of the bolt. The strut and socket are held in position as shown, the end of the strut abutting against the annular shoulder at the base of the cone and the tip of the socket in butt contact with the head of the bolt, by the tension of the drift wire and its counter.

In the modification shown in Figs. 4–7, the joint fittings provide for lift as well as drift connections. The two plates of the double web member 2ª, shaped to straddle at their ends two of the four tubes of the chords of the spar 1ª, are here of a more or less X-shape providing both upper and lower tapering side extensions $3^a$, and both plates are extended beyond the chord tubes at their lower ends (for the upper wing spar shown) to provide lateral ears $5^a$ and an intermediate ear $6^a$. The double cupped plate $9^a$, consisting of two similar plates nested together, is bolted to the center of the web plates by the ball-head bolt $8^a$; and of the four arms with which this cupped plate is provided, the oppositely disposed forked arms $11^a$ and $12^a$ serve, as before, for the anchorage of a drift wire and its counter, while a third arm $21^a$, extending in a plane at substantially right angles to the plane of the two forked arms and having a lead angle of about sixty degrees to the axis of the cup, serves as an anchorage for an incidence wire, and the fourth arm $22^a$, leading from the rim of the cupped plate at an acute angle to and for a portion of its length integral with the arm $12^a$, provides an anchorage for a stay wire from the body of the airplane. These two additional arms are not cut away and forked because of the high lead angle of one and the low stresses to which the other is subjected. The plates should be drilled, at the bottom of the cup for the bolt and at the ends of the arms for the clevis-pins, after the blanks have been shaped up and the two plates nested together. A drift strut 23 is here joined to the spar in the manner, and by means of the same cone-shaped socket 24, heretofore described. For the attachment of the lift strut 27, the strut has secured to its end a cap 28 with parallel projecting lugs 29 which fit between and are pivoted to the intermediate ears $6^a$ of the web plates by a clevis-pin 30. The lateral ears $5^a$ of the double web plate, drilled to receive clevis-pins (on one side with the addition of a bushing), provide anchorages for a lift wire and its counter. It will be observed that here, as in the joint previously described, the lines of action of all the different joint members are brought at different angles and from different planes to a common point substantially at the gravity axis of the spar.

The tetrahedral wing frame illustrated in the remaining figures of the drawings comprises upper longitudinals and transverse connecting members 31 and 32, similar lower longitudinals and transverse connecting members 33 and 34, and a plurality of regularly disposed diagonal braces 35 each of which is joined at one end, with two others, to an upper panel point and at the other end, with two other but different braces, to a lower panel point. As shown, each of the longitudinals is a spar of four tubes and both the transverse connecting members and the diagonal braces are also tubular. The joint fittings at each panel point consist of the X-shaped web plate $2^b$, framed horizontally between the upper and lower tubes of the longitudinal spar and extended at their ends to provide the four arms $4^b$ and $5^b$, and the cupped plate $9^b$ which is bolted centrally to the web plate, by a ball-head bolt $8^b$, and has three arms extending therefrom in planes at equal angles to each other. The shaped ends $32^b$ of four transverse connecting members are telescopically united to the four arms of the web plate, and the similarly shaped ends $35^b$ of three diagonal braces are in like manner united to the three arms of the cupped plate.

It will of course be understood, from the above illustrations, that the several features of my invention may either be combined together in a single joint fitting or may be used separately as desired, and that each may be modified in its structural details, within the scope of the appended claims, without departing from the spirit or sacrificing the advantages thereof.

What I claim as new, and desire to secure by Letters Patent, is—

1. A joint fitting which comprises a curvilinearly cupped metallic plate having in the bottom of the cup an opening through which to pass a bolt and leading therefrom one or more integral arms curved at the rim in substantial conformity therewith.

2. A joint fitting which comprises a curvilinearly cupped metallic plate having in the bottom of the cup an opening through which to pass a bolt and leading out therefrom a lateral arm integral with the rim and divided thereat into two spaced forks.

3. A joint fitting which comprises a cupped metallic plate having in the bottom of the cup an opening through which to pass a bolt and integral with its rim an arm leading therefrom at an oblique angle to the axis of the cup and divided into two forks separated one from the other at the rim of the cup to a degree dependent upon and varying inversely with the angle of lead of the arm.

4. A joint fitting which comprises a member with hollow terminal having walls gradually contracting in diameter and increasing in thickness in each axial section as they approach the outer end.

5. A joint fitting which comprises a member with hollow socket terminal having walls with contracting inner and outer surfaces one a dome-shaped and the other a substantially conical surface.

6. A joint fitting which comprises a cone-shaped socket having walls tapering in thickness between a skirt enclosed open base and a closed tip.

7. A joint fitting which comprises a cone-shaped socket having walls tapering in thickness between a skirt enclosed open base and a closed tip the outer end surface of which is spherically curved.

8. A joint fitting which comprises a metallic plate which is adapted to form a part of the web of a girder and has tapering side extensions at one at least of its ends.

9. A joint fitting which comprises, as elements thereof, a bolt having a head with curved inner surface and a metallic plate curvilinearly cupped to fit the head of the bolt and having in the bottom of the cup an opening through which to pass the bolt and integral with the rim one or more arms leading therefrom and adapted to distribute the stress of the load transmitted thereby through a considerable arc of the rim.

10. A joint fitting which comprises, as elements thereof, a bolt having a head with inner surface spherically curved and a metallic plate spherically cupped to fit the head of the bolt and having in the bottom of the cup an opening through which to pass the bolt and one or more lateral extensions leading therefrom and curvilinearly connected with the rim of the cup through a considerable arc thereof.

11. A joint fitting which comprises, as elements thereof, a bolt having a head with inner surface spherically curved, and a spherically cupped metallic plate having in the bottom of the cup an opening through which to pass the bolt and integral with the rim an arm leading therefrom at an oblique angle to the axis of the cup and cut away through a portion of its length to provide two forks separated one from the other at the rim of the cup.

12. A joint fitting which comprises, as elements thereof, a bolt having a head with inner surface curved on a radius approximately equal to the diameter of the bolt, a metallic plate which is cupped to fit the head of the bolt and has in the bottom of the cup an opening through which to pass the bolt and integral with the rim an arm leading therefrom at an acute angle to the axis of the cup and divided through a portion of its length to provide two forks separated one from the other at the rim of the cup to a degree dependent upon the angle of lead of the arm.

13. A concentric joint fitting which comprises, as elements thereof, a bolt having a head with curved inner surface, a cupped metallic plate adapted to receive the bolt and having integral anchorage arms leading therefrom at an oblique angle to the axis of the cup, and a tapered socket having a curved tip adapted to make and be held in butt contact with the complementarily curved outer surface of the bolt head.

14. A concentric joint fitting which comprises, as elements thereof, a bolt having a head with inner surface spherically curved, a spherically cupped plate adapted to receive the bolt and having an integral anchorage arm leading therefrom at an oblique angle to the axis of the cup, and a cone-shaped socket with walls gradually tapering in thickness between base and tip and adapted at the tip to fit and be held in ball and socket engagement with the head of the bolt.

15. A concentric joint fitting which comprises, as elements thereof, a plate adapted to form a part of the web of a girder and having taperingly inclined side extensions at one at least of its ends and a central opening through which to pass a bolt, a cupped plate having at the bottom of the cup an opening through which to pass a bolt and integral with the rim one or more arms leading therefrom at an oblique angle to the axis of the cup, and a bolt having a head with curved inner surface by which to secure the two plates together.

16. A concentric joint fitting which comprises, as elements thereof, a web plate having taperingly inclined side extensions at one at least of its ends and a centrally located opening through which to pass a bolt, a cupped plate having at the bottom of the cup an opening through which to pass a bolt and integral with the rim anchorage arms leading outwardly therefrom at an oblique angle to the axis of the cup, a bolt having a head with curved inner surface by which to secure the two plates together, and a tapered socket having walls tapering in thickness from base to tip and adapted at the tip to be held by a ball and socket engagement in butt contact with the head of the bolt.

CHARLES WARD HALL.